Figure 1:
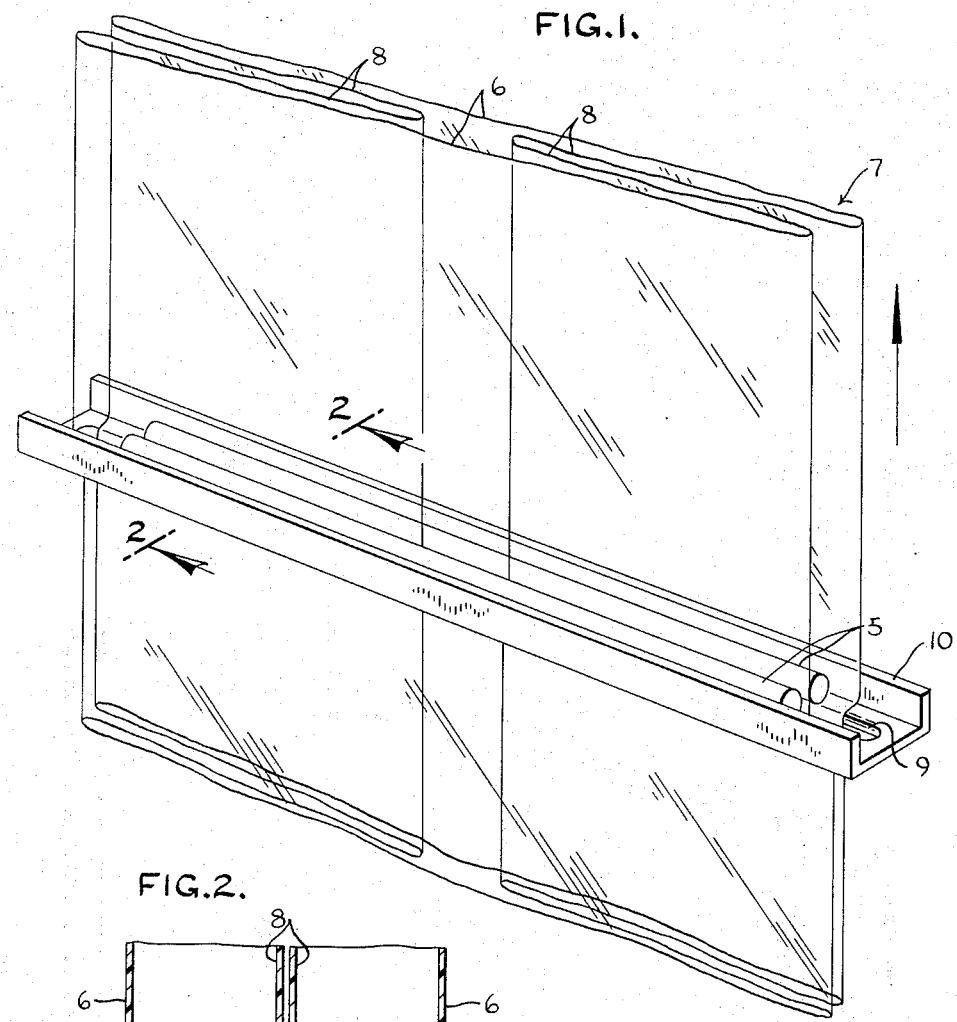

United States Patent [19]
Dahlberg

[11] 3,802,156
[45] Apr. 9, 1974

[54] APPARATUS FOR ELIMINATING COHESION BETWEEN OVERLYING PLIES OF PLASTIC FILM MATERIAL

[75] Inventor: Thomas J. Dahlberg, Wyoming, Minn.

[73] Assignee: Possis Corporation, Minneapolis, Minn.

[22] Filed: May 11, 1973

[21] Appl. No.: 359,620

Related U.S. Application Data
[62] Division of Ser. No. 161,669, July 12, 1971.

[52] U.S. Cl. ................................................. 53/384
[51] Int. Cl. ........................................... B65b 43/26
[58] Field of Search ....................... 53/384, 241, 256

[56] References Cited
UNITED STATES PATENTS
| | | | |
|---|---|---|---|
| 3,308,601 | 3/1967 | Masters | 53/241 X |
| 3,287,881 | 11/1966 | Jelling et al. | 53/241 X |
| 3,360,901 | 1/1968 | Gallo | 53/384 X |

Primary Examiner—Travis S. McGehee

[57] ABSTRACT

Adhesion between the overlying plies of a flattened tubular web of plastic film material is eliminated by drawing the web lengthwise past a rod which is supported in a position transverse to the web and is interposed between its plies.

2 Claims, 2 Drawing Figures

APPARATUS FOR ELIMINATING COHESION BETWEEN OVERLYING PLIES OF PLASTIC FILM MATERIAL

This application is a division of my copending allowed application, Ser. No. 161,669, filed July 12, 1971.

This invention concerns the problem of objectionable cohesion between overlying plies or sheets of thin plastic material.

The specific problem solved by the invention was encountered in the operation of a machine for wrapping, en masse, large numbers of loose objects such as boxes, cans and various containers, in plastic film. Usually the objects to be wrapped are piled on a pallet to facilitate transporting them from place to place. As such, they are considered a palletized load. These palletized loads are successively brought to the machine, which then draws gusseted tubular plastic stock down over the load.

The gusseted tubular stock is supplied in rolls from which the machine pulls it as a flattened web and feeds it downwardly towards the load in position to be wrapped. A cutoff knife severs the web at a distance from its end such that the severed length is long enough to encompass the load, but the knife does not act until heat sealing devices secure certain of the overlying plies of the web to one another to at least partially close the tubular web. Since the cutoff knife is located upstream of the location at which the heat sealing devices work, the partial (or complete) closure contacts the top of the load to limit the extent the tubular stock can be pulled down onto the load, and thereby precludes having the enwrapment pulled away from the upper portion of the load during the subsequent heat shrink operation by which the plastic film is shrunk into intimate contact with the load.

To facilitate opening the tubular web preparatory to having it drawn down over the load, the web is not severed until tube opening devices act upon the end of the web. The tube opening devices include suction cups which approach the pendent length of the tubular gusseted stock from opposite sides of the machine and attach themselves to the side panels of the web just before the cutoff knife acts. By means of the suction cups, which are now moved outwardly, the side panels are drawn away from one another to thereby open the gussets and form the web of the tubular stock into a tube. This is the way the machine should work, and it does if nothing interferes with separation of the side panels. But the inevitable cohesion between overlying plies of thin plastic material — whether caused by static electricity or otherwise — made it difficult for the suction cups to reliably open the tubular stock.

Some way had to be found to eliminate the cohesion between the side panels and between the side panels and the gussets therebetween. This invention achieves that objective by a method which entails drawing the gusseted flattened web of plastic film material lengthwise past rods which are positioned transversely of the web, between the plies thereof.

Figure 2:
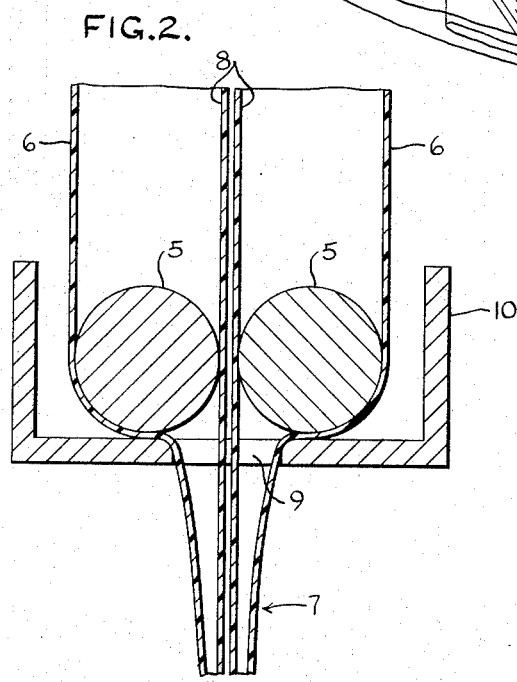

The accompanying drawing illustrates one way in which the method of this invention can be practiced, and in which:

FIG. 1 is a more or less diagrammatic perspective view showing how the rods are supported in a channel-shaped member having a slot in its bottom through which the flattened tubular web is drawn; and FIG. 2 is a cross sectional view taken on the line 2—2 of FIG. 1.

Referring now more particularly to the drawing, it will be noted that a round rod 5 is inserted between each outer side panel 6 of the gusseted tubular web 7 and its inwardly adjacent gussets 8. To enable such insertion holes are simply cut into the web at the junctions of the side panels and the gussets. The rods are in side-by-side relationship and extend transversely of the web. Necessarily, the rods are located at a point in the path of the web 7 between the roll from which the web is drawn and the heat sealing device. At that point, the web travels upwardly as indicated by the arrow in FIG. 1 and, accordingly, the rods are horizontally disposed.

One convenient way of supporting the rods 5 and also of assuring contact between the rods and the side panels and gussets, is to have the web pass through an elongated slot 9 in the bottom of an upwardly facing channel member 10 that is fixedly mounted on the frame of the machine. The width of the slot must be less than the diameter of the rods 5 to keep the rods from falling through the slot, and the inside width of the channel should be a bit greater than twice the diameter of the rods, so that the rods can float up and down in the channel as the web is drawn upwardly past them.

Though the diameter of the rods 5 is not critical, ¾ inch rods have been found to be quite satisfactory. Also, the material of which the rods are made is not critical, but metal rods are perhaps preferable.

Just why the passage of the web past the rods — but, of course, in contact with them — eliminates the objectionable cohesion, is not known. But in any event, all cohesion problems in the operation of the aforesaid wrapping machine have been overcome by the incorporation of these rods into the machine.

From the foregoing description, together with the accompanying drawing, it will be readily apparent to those skilled in the art that this invention is useful for the elimination of cohesion between the plies of gusseted as well as non-gusseted plastic film material in flattened tubular condition; and that the invention can be practiced in apparatus other than as herein disclosed for purposes of illustration.

The invention is defined by the following claims.

I claim:

1. A device for eliminating cohesion between plies of a gusseted flattened tubular web of plastic film material as it travels upwardly along a defined path, comprising:

A. an elongated metal bar disposed horizontally in the path of the upwardly traveling gusseted plastic web, said bar having a longitudinally extending slot long enough to accommodate the width of the gusseted plastic web so that said web can be drawn upwardly through the slot;

B. a pair of unconnected separate metal rods loosely lying on said bar, the cross sectional dimension of each of said rods being greater than the width of said slot, and each rod being long enough to span substantially the entire width of the side panels of the plastic web, so that as the gusseted plastic web travels upwardly through said slot with one of said rods between each of its side panels and its adjacent gussets, the rods will not drop through the slot but will separate the side panels of the web from their adjacent gussets; and C. upwardly projecting barriers on said bar at opposite sides of the slot therein and between which said rods are confined in side-by-side relation.

2. The cohesion eliminating device of claim 1, wherein each of said rods is round in cross section.

* * * * *